United States Patent

[11] 3,539,193

[72] Inventor Hubert J. Parsons
     Horseheads, New York
[21] Appl. No. 766,203
[22] Filed Oct. 9, 1968
[45] Patented Nov. 10, 1970
[73] Assignee Hardinge Brothers, Inc.
     Elmira, New York

[54] SEALS FOR COLLETS
     7 Claims, 10 Drawing Figs.
[52] U.S. Cl. .................................................. 279/51
[51] Int. Cl. .................................................. B23b 25/04,
                                                              B23b 31/20
[50] Field of Search ..................................... 279/1(ME),
                                                              1(S), 51, 1(R)

[56]                  References Cited
              UNITED STATES PATENTS
2,012,826   8/1935   Montgomery ................ 279/1(ME)UX 2,448,423   8/1948   Dodge ......................... 279/1(ME)UX
2,557,301   6/1951   Lundy .......................... 279/1
              FOREIGN PATENTS
482,766     1938     Great Britain ................ 279/1(ME)UX Primary Examiner—Robert C. Riordon
Assistant Examiner—Donald D. Evenson
Attorney—Shlesinger, Arkwright and Garvey ABSTRACT: This disclosure relates to collets of the type commonly used on lathes or similar machines for holding workpieces or tools, and in which the collet head is divided into segments spaced from each other by radial slots in which sealing members are arranged to exclude oil and other foreign material from passing through the slots, and in which the slots are so formed that the sealing members may be passed lengthwise into and out of their operative positions in said slots from the outer face of the collet.

Patented Nov. 10, 1970
3,539,193
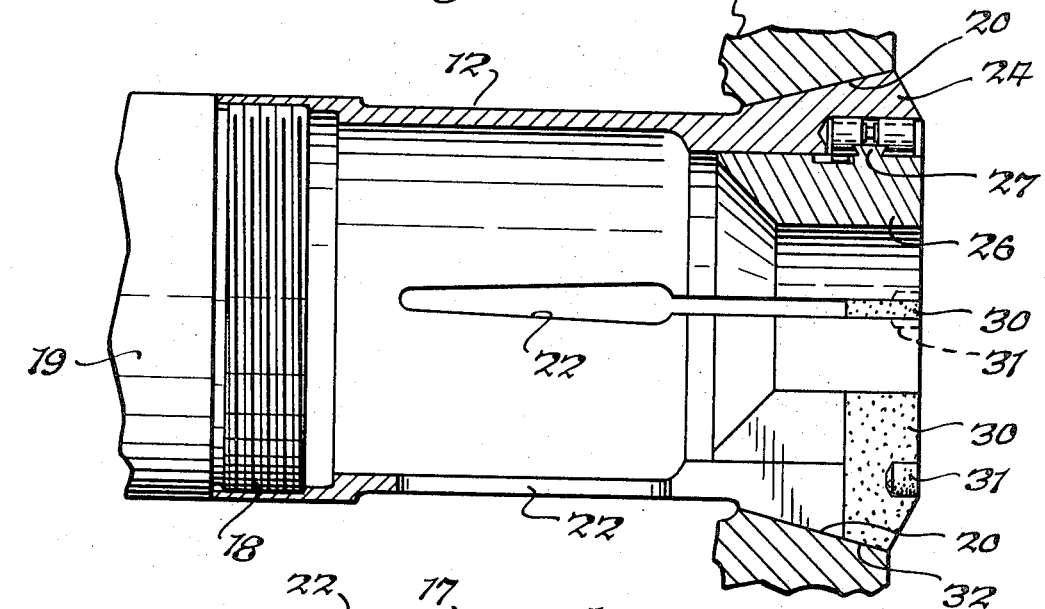
Fig. 1.
Fig. 2.
Fig. 3.
Fig. 4.
INVENTOR.
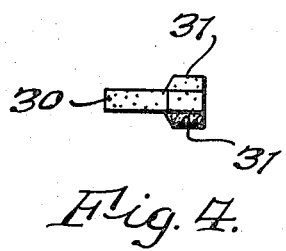
ATTORNEYS.

Patented Nov. 10, 1970

INVENTOR.
Hubert J. Parsons
BY
Parker & Stockman
ATTORNEYS.

SEALS FOR COLLETS

In the accompanying drawings:

FIG. 1 is a sectional elevation of a collet embodying this invention, taken on line 1–1, FIG. 2.

FIG. 2 is an end view of the collet.

FIG. 3 is a side view of a sealing member to be arranged between segments of the head of the collet to prevent passage of lubricant or cutting fluid lengthwise of the collet from the outer end thereof.

! FIG. 4 is an end view of the sealing member shown in FIG. 3.

Figure 5:
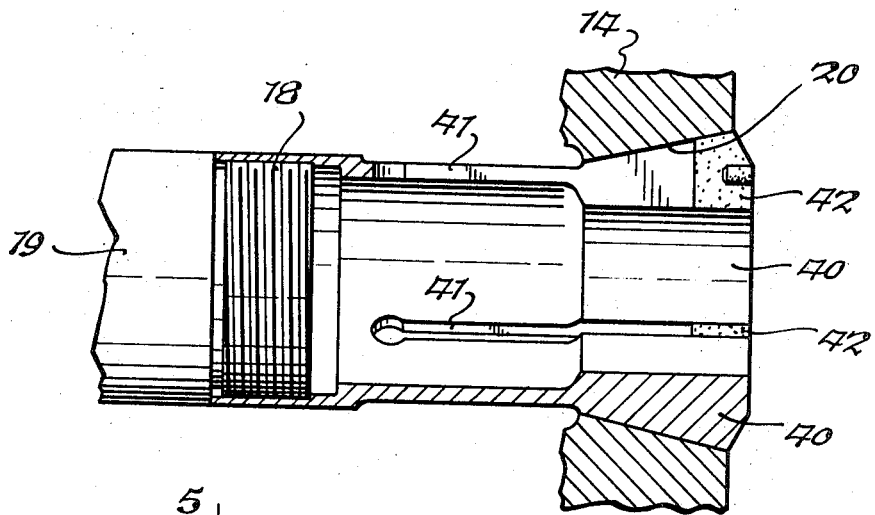
FIG. 5 is a central sectional elevation of a collet of modified construction as seen on line 5–5, FIG. 6.

The particular embodiment of this invention in the collet shown in FIGS. 1–4 includes a body 12 of cylindrical shape which is arranged in a spindle 14 of a machine and the body of the collet may be keyed to the spindle by any suitable means, such as a key (not shown) on the spindle extending into a slot or recess 17 in the body of the collet. The body is also provided with a threaded end 18 for connection with a draw tube 19 for moving the collet back and forth relatively to the inner frustoconical face 20 of the part 14 of the spindle.

The collet head is divided by longitudinal slots 22 extending inwardly from the outer end thereof into a series of segments 24, four such segments being shown in the construction illustrated in FIGS. 1 and 2. The slots 22 extend into the body portion and form resilient fingers which urge the segments 24 thereof outwardly into contact with the frustoconical bore 20 of the outer part of the spindle. The inner bore of the collet head may be of any suitable or usual construction for gripping a workpiece or tool but in the construction illustrated the inner faces of the segments 24 are provided with pads 26 which are removably secured to the inner faces of the segments 24 by any suitable, well known holding means, such for example as those shown in O'Connell U.S. Pat. No. 2,234,603. For this purpose each pad has an outwardly extending projection 27 of dovetail shape which extends outwardly beyond the peripheral outer surface of the pad which engages with the segments 24, this projection cooperating with the holding means.

In the construction illustrated it is desired to provide seals which prevent oil or other liquids from entering into the slots 22 and it also has been found desirable to have these sealing devices enter into the slots from the outer end of the head so that they are readily accessible and can be inserted or removed with ease. In the construction shown for this purpose I have provided sealing members of rubber or other elastic material which as shown in FIGS. 3 and 4 comprise flat or substantially rectangular parts 30 provided at one end thereof with substantially semicylindrical projections 31.

The flat sections 30 of the sealing members can be inserted into the slots 22 to fit snugly therein when the segments are separated, and the portions of the segments 24 adjacent to the slots are provided with holes or recesses which may be drilled into these segments to lie at opposite sides of the slots. These holes or recesses are formed to receive the semicylindrical projections 31 and act as stops to limit the extent to which the sealing members may be inserted into the slots 22. It is understood of course that the slots are formed between the pads 26 as well as between the segments 24 and consequently when the sealing members are inserted into the slots 24 they will also extend between the ends of the pads, as clearly shown in FIGS. 1 and 2. One end of each of the sealing members is provided with an inclined edge 32 which fits against a part of the frustoconical bore 20 of the spindle. These sealing members may be made of any desired length and after they are inserted into the collet head from the outer face thereof, parts of these pads will extend inwardly beyond the inner surface of the pads and these parts of the sealing members are then cut off and discarded so that the sealing members will appear as shown in FIGS. 1 and 2.

In making these sealing members of a resilient material, such as rubber or neoprene, these sealing members will exert pressure against the pads and the segments so as to urge them upwardly against the frustoconical surface 20, thus supplementing the spring action of the portions of the body between the slots 22.

It is of course an easy matter to insert the sealing pads into the ends of the slots from the head of the collet and also, if desired, to remove the seals from the collet. This can be easily done by inserting an implement into the back of a sealing member and pushing the sealing member out, without opening the slots 22 to any greater extent than permitted by the drawn tube and frustoconical face 20. Consequently the pads can be easily removed and replaced after the seals have been removed. When the sealing members are removed the pads move toward the axis of the collet to an extent necessary to permit the projections 27 of the pads to move toward the axis of the collet sufficiently to clear the holding means so that the projections 27 can be moved axially out of the collet with their pads. With the sealing parts arranged so that they can be removed and inserted from the front of the collet head, the removal and replacement of pads 15 is greatly facilitated over constructions in which the sealing members were inserted from the outer surface of the collet, in which access is prevented by the engagement of the segments with the frustoconical face 20 which would require the collet to be removed from its draw tube and moved outwardly to provide access to the sealing member.

Figure 6:
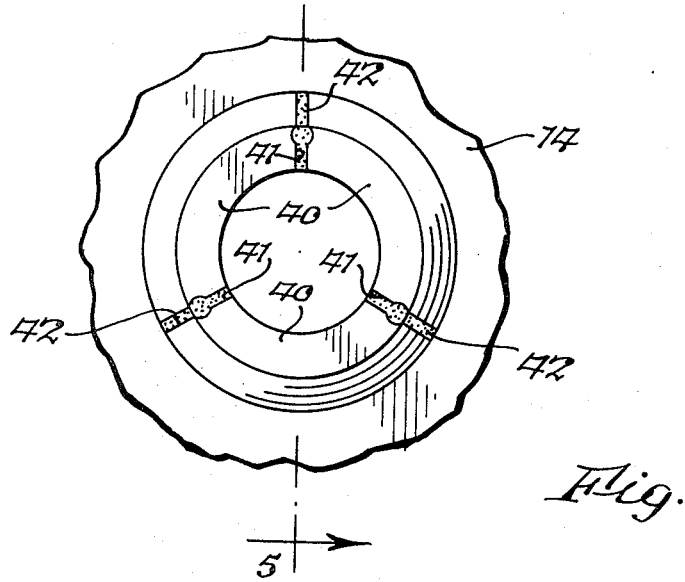
FIG. 6 is an end view of the collet shown in FIG. 5.

In the particular construction shown in FIGS 5 and 6, no pads are provided and the segments 40 are required to grip the work or tool. In this case the sealing members 42 are similar in shape to those shown in FIGS. 3 and 4 except that the flat portions are required only to extend from the frustoconical surface to the inner surface of the segments. Otherwise the structures in FIGS. 5 and 6 are similar to those shown in FIGS. 1 and 2 except that the body is provided with three slots 41 forming three segments.

In FIGS. 7–10 I have illustrated my improvement applied to a collet head of the type shown in FIGS. 1–5 of my pending U.S. Pat. application Ser. No. 572,844 now abandoned, filed Aug. 16, 1966. In this construction the body portion 50 is of cylindrical shape without any slots extending into the same. The head of the collet is separate from the body portion and is divided by longitudinal slots 52 into a series of segments 54, four such segments being shown in FIGS. 7 and 8. These segments may be provided with pads 56 suitably mounted on the segments 64. The segments jointly form a substantially frustoconical surface for cooperation with a frustoconical surface of a lathe spindle such as shown in FIGS. 1 and 2.

The connection between the body of the collet and the segments of the head is such as will allow longitudinal movement to be transmitted from the body to the segments and the segments are permitted to move radially relatively to the body into and out of engagement with the work or tool to be held. This may be effected by suitable releasable connections between the body and the segments. In the particular construction shown by way of example, the segments of the head are provided with outwardly extending projections or keys 58 formed to fit into the annular grooves 60 of the body. By means of this arrangement it will be noted that the segments of the collet head may move relatively to a limited extent.

In order to prevent the segments of the collet from opening farther than necessary when the collet is removed from the spindle, I preferably provide the segments with an annular groove 62 and a spring ring 64 within this groove which ring does not extend to the bottom of the groove and consequently does not interfere with the normal radial adjustments of these segments.

Three segments are provided with radially extending holes 66 formed across the slots to receive resilient sealing members 68 which are or rubber or other resilient material and are therefore enabled to act as springs to open the collet when the same is moved forwardly, the holes and the sealing members being provided at the meeting edges of the segments so as to urge the segments away from each other. These sealing members 68, in addition to acting as springs to move the segments away from each other, also act as seals to prevent liquid or other material from passing through the slots or spaces between the segments.

In this construction it is also very desirable to provide sealing members which are insertable from the outer face of the collet head. For this purpose I have provided sealing member 70 which include substantially flat parts 72 formed to enter into the slots between the segments, and these sealing members are also provided at opposite faces thereof with semicylindrical parts 74 adapted to pass into holes drilled at the meeting ends of the segments 54. The flat portions 72 of these sealing members, which enter into the slots between adjacent segments, are formed so that they can be pushed into the slots to a sufficient extent to contact with the sealing members 68 and thus form a complete seal against any liquid which may pass into the slots of the collet head.

The sealing members 70 can be easily removed from the slots as described in connection with FIGS. 1 and 2 so that different sealing members may be positioned between the pads 56 which may be of different radial dimensions, thus requiring different sealing members 70. However, regardless of change of dimensions of the pads, the sealing members 68 need not be removed since they will operate regardless of the dimensions of the pads 56.

Figure 7:
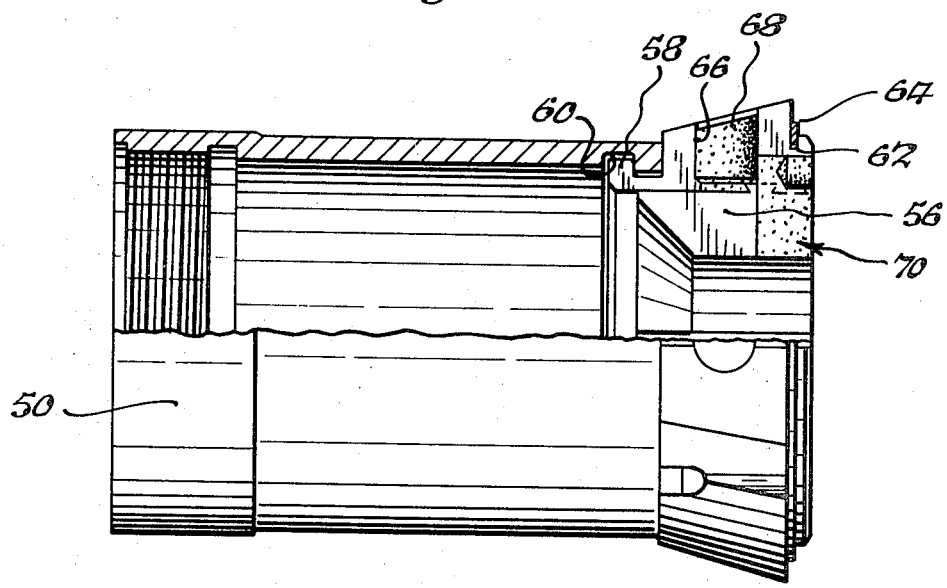
FIG. 7 is a side elevation of a collet of another modified construction, the upper half of the view being a central section thereof.
Figures 8, 9, 10:
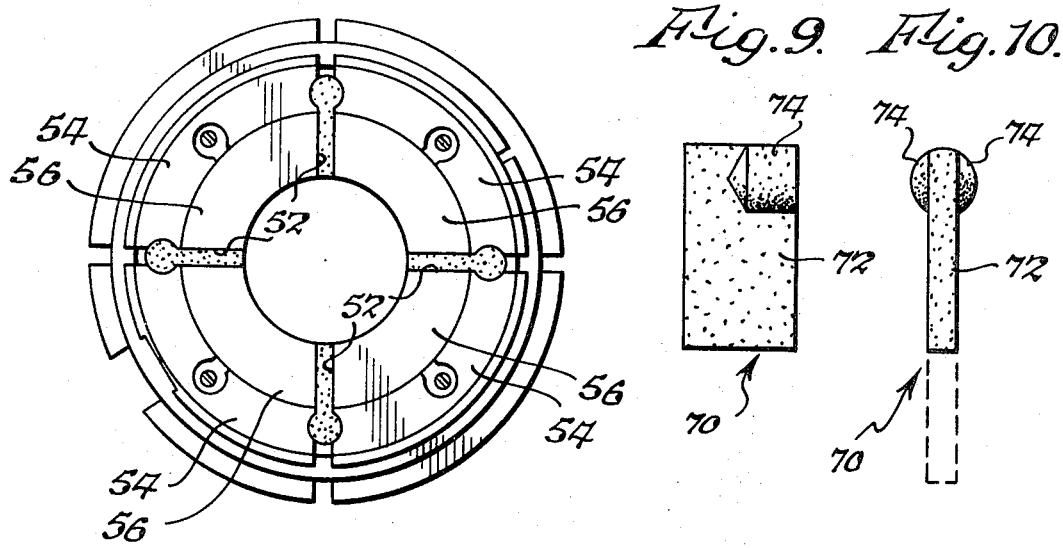
FIG. 8 is an end view of a collet shown in FIG. 7.
FIGS. 9 and 10 are a face view and an end view respectively of a sealing member employed in the collets shown in FIGS. 7 and 8.

In the construction shown in FIGS. 7 and 8 the sealing members 68 may remain in the segments while the pads 56 are changed from time to time. Consequently the sealing members 70 which are insertable and removable from the outer face of the collet, can be readily inserted and removed whenever pads of different sizes are required. When this collet is intended for use on tools or work of different diameters, the pads 56 only are removed so that the sealing members 68 are not disturbed.

It will be understood that various changes in the details, materials and arrangements of parts which have been herein described and illustrated in order to explain the nature of the invention may be made by those skilled in the art within the principle and scope of the invention as expressed in the appended claims.

I claim:
1. A machine tool collet including:
   a. a cylindrical body having a longitudinal axis;
   b. a collet head at the outer end of said body having a front face;
   c. a plurality of radial slots extending parallel to said longitudinal axis for dividing said head into a plurality of segments each having an inner surface and an outer surface;
   d. each of said segments having a recess adjacent each of said slots extending rearwardly parallel to said longitudinal axis from said front face of said collet head;
   e. individual seal means insertable into said slots from said outer end of said body;
   f. each of said seal means having a flat body portion with front and rear edges and projections on each side of said body portion conforming to said recesses;
   g. said projections cooperating with said recesses; and
   h. each of said seal means extending radially inwardly from said projection to said inner surface.

2. A machine tool collet as in claim 1 and wherein: said projections and recesses have arcuate cooperating surfaces.

3. A machine tool collet as in claim 2 and wherein: said projections extend rearwardly approximately one-half of the longitudinal dimension of said seal means.

4. A machine tool collet as in claim 2 and wherein: each of said seal means extends radially outwardly from said projections to said outer surface.

5. A machine tool collet as in claim 1 and including: interlocking parts between said segments and said body for holding said body and said segments against longitudinal movement relative to each other and permitting limited radial movement of said segments relative to said body.

6. A machine tool collet as in claim 1 and including:
   a. work engaging pads secured to said inner surfaces of said segments; and
   b. each of said seal means extending radially inwardly and coextensively with said pads.

7. A machine tool collet as in claim 2 and wherein: said projections extend from the front edge of said seal rearwardly and ending short of the near edge of said seal.